INVENTOR.
JEFFREY M. LAZAR
BY Charles J. Ungemach
ATTORNEY

United States Patent Office 3,468,220
Patented Sept. 23, 1969

3,468,220
CONTROL SYSTEMS
Jeffrey M. Lazar, Rosemount, Minn., assignor to Honeywell Inc., Minneapolis, Minn., a corporation of Delaware
Filed Jan. 25, 1967, Ser. No. 611,604
Int. Cl. F15b 13/02
U.S. Cl. 91—3                     11 Claims

ABSTRACT OF THE DISCLOSURE

A control system for obtaining closed loop position control having a bistable amplifier that can be driven into a stable or an unstable state for supplying a control fluid to the apparatus to be controlled.

---

The invention herein described was made in the course of or under a contract or subcontract thereunder, with the Department of the Air Force.

Background of the invention

This invention relates to position control systems, and more particularly to a fluidic closed loop position control system.

In position control systems, where the position of a piston within a chamber is to be controlled by a differential fluid signal, it is desirable to have a reliable, low-cost, fast differential fluid supply means. The prior art has employed mechanical means as well as hydro-mechanical means as the differential fluid supply means. With the advent of the new fluidic technology, fluid amplifiers have been used as the differential fluid supply means since the fluid amplifiers are reliable, low-cost devices.

In fluidic control systems a proportional system is often required in which the position of a piston within a chamber can be varied in proportion to an input signal. To date proportional fluidic control systems have used proportional fluid amplifiers as the differential supply means and consequently have been limited in dynamic or time response by the inherent characteristics of the proportional fluid amplifiers that supply the differential fluid signal. Bistable fluid amplifiers, on the other hand, if used as the differential fluid supply means, offer fast time response because a small input signal into the bistable amplifier produces a large output signal to rapidly position the piston, however, to date bistable amplifiers could not offer proportional control.

I have discovered that, by using a special negative feedback circuit and a bistable fluid amplifier having a stable and an unstable operating region, I can obtain a proportional differential control system with a fast time response.

Summary

Briefly, one embodiment of the present invention comprises a negative feedback fluidic circuit in which a bistable amplifier is connected to a high impedance load so that the bistable amplifier becomes unstable and operates as a fluid oscillator when no control signal is present in the bistable fluid amplifier. However, when a control signal is supplied to the bistable amplifier it becomes stable and produces a large output signal to rapidly position a piston within a chamber. The alternate embodiment of my invention employs an excessive negative feedback loop instead of a high impedance load to cause the bistable fluid amplifier to perform as an oscillator when no control signal is present in the bistable fluid amplifier.

Brief description of the drawing

A more thorough understanding of my invention may be had by referring to the attached drawings in which.

Description of the preferred embodiments

Figure 1:
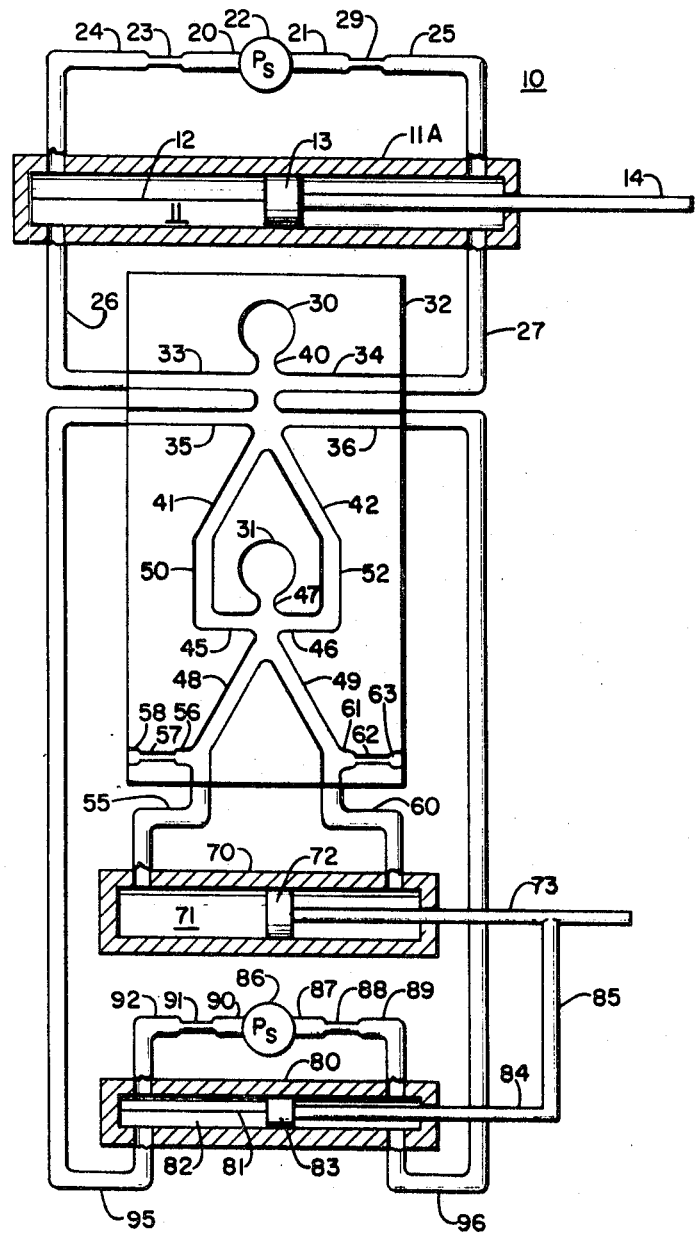
FIGURE 1 shows a schematic view of my closed loop position control system.

Referring now to FIGURE 1, reference numeral 10 generally depicts my fluidic position control system. A fluid potentiometer 11A is shown to comprise an elongated cylindrical chamber 11 having a narrow slit 12 passing through one wall and extending the full length of the chamber 11. A piston 13 is slidable in chamber 11 by means of a control rod 14 which passes in a slidable sealed relation through one end of the chamber, the other end of the chamber being sealed. A fluid is supplied to one end of the cylindrical chamber from a fluid source 22 through a passage 20, a restriction 23 and a passage 24. Fluid is supplied to the opposite end of the chamber 11 from fluid source 22 through a passage 21, a restriction 29 and a passage 25. Also located at opposite ends of the chamber are a pair of outlet passages 26 and 27.

A pair of fluid amplifiers 30 and 31 are shown fabricated in a block of material 32. Fluid amplifier 30 is proportional and fluid amplifier 31 is bistable. Fluid amplifier 30 has a first control port 33, a second control port 34, a third control port 35, and a fourth control port 36. A fluid amplifier having more than two control ports, like fluid amplifier 30 is commonly referred to as a summing amplifier since fluid signals from two different sources can be summed within the amplifier 30. Amplifier 30 further has a power nozzle 40, a first outlet leg 41, and a second outlet leg 42.

Connected to proportional summing amplifier 30 is the bistable amplifier 31 having a first control port 45, a second control port 46, a power nozzle 47, a first outlet leg 48, and a second outlet leg 49. First control port 45 connects to the outlet leg 41 through a passage 50 and the second control port 46 connects to the outlet leg 42 through a passage 52. Connected to the outlet leg 48 is a passage 55, and a vent passage 56 that exhausts the excess fluid from the fluid amplifier 31 through a restriction 57 and a passage 58. Similarly, outlet leg 49 has a passage 60 attached thereto and a vent passage 61 for exhausting excess fluid through a restriction 62 and a passage 63.

The piston whose position is to be controlled by a fluid signal, is shown contained in a housing 70. A cylindrical chamber 71 is shown having a piston 72, whose position is to be controlled, connected to a connecting rod 73. Piston 72 is caused to slide in chamber 71 by means of the fluid differential signal supplied from fluid passages 55 and 60. The control rod 73 passes in slidable sealed relation through one end of the chamber, the other end of the chamber being sealed.

A second fluid potentiometer 80 is shown to comprise an elongated cylindrical chamber 82 having a narrow slit 81 passing through one wall and extending the full length of the chamber. A piston 83 is caused to slide in chamber 81 by means of a control rod 84 connected to connecting rod 73 through a common connecting link 85. Fluid is supplied from a common source 86 to one side of the chamber 82 through a passage 87, a restriction 88 and a passage 89. The other end of the chamber receives fluid from common source 86 through a passage 90, a restriction 91 and a passage 92. Also located at opposite ends of the chamber 82 are outlet passages 95 and 96.

The fluid potentiometers 11A and 80 are identical in operation so that the operation of only potentiometer 11A will be explained. The operation of the potentiometer 11A is as follows: If the restrictions 23 and 29 are equal, there is no difference between the pressures in output passages 26 and 27 when the piston 13 is at the center of the cylindrical chamber 11 since equal amounts of fluid flow out through the slits on opposite sides of the piston. As the piston is moved closer to one end of the chamber 11, the pressure at the outlet port at that end increases, since less fluid flows through the slit on that side and the pressure at the other end decreases since more fluid escapes through the slit on that side of the piston. Thus, by displacement of control rod 14 linearly a signal can be obtained in the form of a pressure difference between passages 26 and 27 of variable magnitude and reversible sense. This signal is supplied to control ports 33 and 34 of proportional summing amplifier 30. The control rod 14 is actuated through a suitable mechanical or manual means to displace the piston 13 within chamber 11.

In the operation of the system, the fluid signal to proportionally position the piston 72 within chamber 71 comes from the movement of control rod 14, causing piston 13 to be moved within chamber 11. If the piston 13 is centrally located within chamber 11, the pressures at fluid passages 26 and 27 are equal. Hence, there is no differential fluid signal in the fluid amplifier control ports 33 and 34. In the absence of a differential signal, the fluid stream emanating from power nozzle 40 divides equally between outlet legs 41 and 42. The bistable amplifier 31 normally issues a fluid stream from outlet leg 48 or 49 since it is bistable in operation. However, the impedance that the fluid amplifier 31 sees in its outlet legs 48 or 49 is selected so that when no differential control signal is present at ports 45 and 46, the bistable amplifier 31 becomes unstable. That is, the value of the restrictions 57 and 62 are so selected, that with no differential fluid control signal at control ports 45 and 46 the bistable amplifier 31 is overloaded and becomes unstable. When this overloading condition or unstability occurs, the fluid stream oscillates between outlet legs 48 and 49 resulting in the bistable amplifier 31 performing as a fluid oscillator. When bistable amplifier 31 oscillates in such a manner, the amount of fluid supplied to outlets 48 and 49 equalizes over a time interval because of the capacitance of chamber 71 so that the fluid differential signal between passages 55 and 60 is zero. That is, no differential fluid signal is present in chamber 71 because the fluid stream oscillates so fast between passages 55 and 60 that piston 72 cannot react to the changes in direction of the fluid flow because of the capacitance of chamber 71. Hence, piston 72 remains in the position that it is located within chamber 71. If piston 72 is not moved the connecting rod 73 is not moved nor is a movement translated to piston 83 through linkage 85 and control rod 84. The second fluid potentiometer 80 thus has equal pressures at outlet passages 95 and 96 since the piston 83 is centrally located within chamber 81. The equal pressure signals at outlet passages 95 and 96 are supplied to the third control port 35 and the fourth control port 36. Thus, with no differential fluid signal supplied to either control port pair 33, 34 or control port pair 35, 36, the fluid stream flowing from power nozzle 40 continues to flow equally into outlet legs 41 and 42 resulting in no movement of the piston 72.

The connecting rod 73 attached to piston 72 is connected to some device, which is to be controlled. The device being controlled may be anything from an aileron on an aircraft to the workbench of a machine. Suitable power amplification can be obtained by increasing the diameter of piston 72 and chamber 71; however, for illustrative purposes the piston 72 is shown as comparable in size to the potentiometer pistons 13 and 80.

If the operator, or a signal from another source causes the connecting rod 14 to move the piston 13 within chamber 11, the fluid output signal in passages 26 and 27 changes. If piston 13 approaches the end of the chamber where passage 26 is located, the pressure within passage 26 increases, and corespondingly the pressure within passage 27 decreases causing a proportional signal of higher magnitude at control port 33 than at control port 34. The differential proportional control signal at control port 33 and 34 causes more of the fluid stream from power nozzle 40 to be deflected into outlet leg 42 than outlet leg 41. The differential output signal at outlet legs 42 and 41 is transmitted through passages 52 and 50 to control ports 46 and 45 of bistable fluid amplifier 31. The presence of a larger control signal at the fluid control port 46 drives the bistable amplifier 31 from an unstable state, in which the fluid stream oscillates between outlets 48 and 49, into a stable state in which the fluid stream flows out outlet leg 48 and increases the pressure within passage 55 tending to drive the piston 72 within chamber 71 to the right in the drawing. The absence of the fluid stream at outlet leg 49 correspondingly causes the pressure in passage 60 to decrease causing the piston 72 to travel toward the right in the drawing. The movement of the piston 72 within chamber 71 causes connecting rod 73 to move to the right and actuate the device being controlled. In order to proportionally position the device in the proper position, a negative feedback mechanism is effected through connecting rod 73, linkage 85 and control rod 84. That is, displacement of connecting rod 73 causes the piston 83 to be displaced within the fluid potentiometer 80. The displacement of piston 72 toward the right in the drawing causes piston 83 to also be displaced toward the right increasing the pressure in passage 96 and decreasing the pressure in passage 95. The differential fluid signal at outlet passages 96 and 95 is transmitted into control ports 36 and 35. The potentiometer is selected so that a displacement of the piston causes the differential fluid signal from control passages 96 and 95 to balance out the differential fluid control signal from passages 26 and 27, hence the net differential signal applied to the fluid proportional amplifier 30 is zero. Therefore, the output signal that had increased in outlet leg 42 decreases until the pressure of the fluid in outlet legs 42 and 41 are equal. The equalization of the pressures in outlet legs 42 and 41 causes an equal differential control signal at control ports 45 and 46 of fluid bistable amplifier 31. It will be recalled that when the signals are equal at control ports 45 and 46 bistable amplifier 31 no longer is stable in operation, but becomes unstable and performs as a fluid oscillator. Thus, after the piston 72 has been displaced to the right by the fluid flowing in passage 55 there is no signal to return the piston 72 to its central location since the bistable amplifier functions as an oscillator and provides equal signals at outlet legs 48 and 49. Hence, it can be seen that a fast time response closed loop position control system has been provided wherein the position of a piston within a chamber is proportionally controlled through the application of a differential signal to a proportional summing amplifier.

The rapid or fast response time of the system stems from the fact that when the control signal is applied at control ports 45 and 46 the bistable amplifier 31 transforms from an oscillator, in which fluid is flowing equally out outlet legs 48 and 49, into a bistable amplifier in which all the fluid flows almost instantaneously from outlet leg 48. Hence, fluid is supplied much faster to the left side of chamber 71 to drive pistons 72 toward the opposite end. With a proportional amplifier, the piston would only be driven as fast as the proportional signal is applied to the proportional amplifier. That is, the bigger the proportional fluid signal applied, the faster the piston would move. However, in the present invention the piston is moved at the same rate almost independent of the magnitude of the differential fluid control signal present at control ports 45 and 46.

Thus, it can be seen that I have provided a closed loop, fast supply means for a piston whose position is to be controlled within a chamber.

Figure 2:
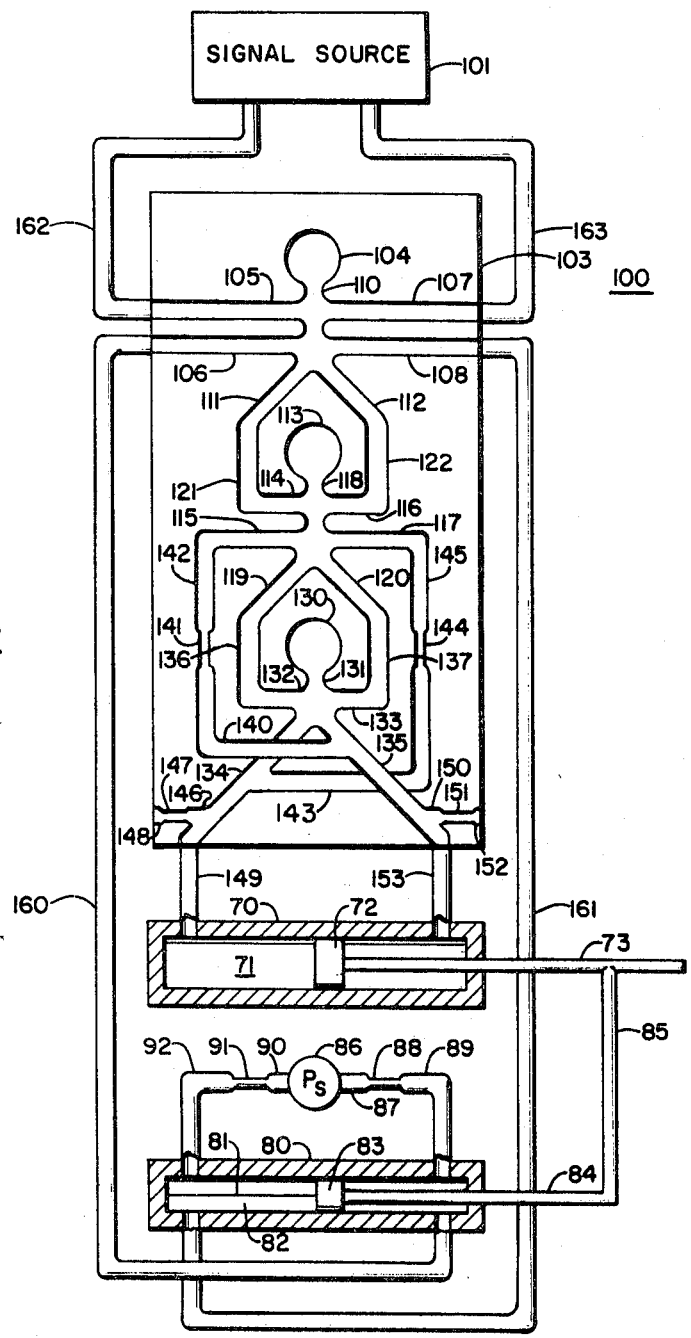
FIGURE 2 shows the alternate embodiment of my closed loop position control system.

Referring now to FIGURE 2, reference numeral 100 generally depicts an alternate embodiment of my fluidic position control system. A signal source 101 is shown, which may be a potentiometer such as shown in FIGURE 1 or any other device which provides a fluid control signal.

Three amplifiers are shown fabricated in a block of material 103. A first fluid amplifier 104 has a first control port 105, a second control port 106, a third control port 107 and a fourth control port 108. A fluid amplifier having more than two control ports, like fluid amplifier 104 is commonly referred to as a summing amplifier since fluid signals from two different sources can be summed within the amplifier 104. Amplifier 104 further has a power nozzle 110, a first outlet leg 111, and a second outlet leg 112.

Connected to proportional summing amplifier 104 is another proportional summing amplifier 113. Amplifier 113 has a first control port 114, a second control port 115, a third control port 116, and a fourth control port 117. Fluid amplifier 113 has a power nozzle 118, a first outlet leg 119, and a second outlet leg 120. Fluid amplifier 113 is connected to fluid amplifier 104 through a first passage 121 and a second passage 122.

The third fluid amplifier 130 is a bistable fluid amplifier. Bistable fluid amplifier 130 has a power nozzle 131, a first control port 132, a second control port 133, a first outlet leg 134, and a second outlet leg 135. Bistable fluid amplifier control port 132 is connected by a passage 136 to fluid amplifier outlet leg 119. Similarily bistable amplifier control port 133 is connected by a passage 137 to fluid amplifier outlet leg 120. Fluid bistable amplifier outlet leg 135 is connected to proportional fluid amplifier control port 115 through a passage 140, a restriction 141, and a passage 142. Similarly, bistable fluid amplifier outlet leg 134 is connected to fluid amplifier control port 117 through a passage 143, a restriction 144, and a passage 145. Attached to bistable amplifier outlet leg 134 is a vent passage 146, a restriction 147, an outlet 148, and a passage 149. Similarily connected to bistable outlet leg 135 is a vent passage 150, a restriction 151, a passage 152, and a passage 153.

Parts of the actuating system which are the same as those shown in FIGURE 1 bear the same reference numerals and since their operation is the same as shown in FIGURE 1 it will not be described here.

The feedback potentiometer 80 has a feedback passage 160 connecting one side of the potentiometer 80 to fluid amplifier control port 106 and a second passage 161 connecting the opposite end of potentiometer 80 to fluid amplifier control port 108.

The operation of the system shown in FIGURE 2 is similar in operation to the system shown in FIGURE 1, however, instead of having the bistable amplifier 130 become unstable from a high impedance load the bistable amplifier 130 becomes unstable from an excessive external negative feedback signal.

Briefly, with no control signal present in proportional summing amplifier 104 the bistable amplifier 130 behaves as an oscillator because of the presence of excess negative feedback. When a control signal is present, some of the excessive negative feedback is compensated for thus causing the bistable amplifier to function normally as a bistable amplifier.

In the operation of my system shown in FIGURE 2, a fluid control signal is transmitted from signal source 101 to fluid amplifier control ports 105 and 107 through passages 162 and 163 respectively. When the fluid control signals in the passages 162 and 163 are equal there is no differential fluid signal between control ports 105 and 107 of fluid amplifier 104. Hence the power stream emanating from power nozzle 110, in the absence of a differential control signal in ports 106 and 108, divides equally between outlet legs 111 and 112. The fluid signals in outlet legs 111 and 112 are transmitted to control ports 114 and 118 of the proportional amplifier 113 through passages 121 and 122 respectively and in the absence of any control signal at control ports 115 and 117 the fluid stream emanating from power nozzle 118 divides equally between outlet legs 119 and 120. The equal pressure signals in outlet legs 119 and 120 are transmitted to control ports 132 and 133 of the bistable amplifier 130 through passages 136 and 137 respectively. However, bistable amplifier 130 when in a stable state does not divide the fluid stream emanating from power nozzle 131 equally between outlet legs 134 and 135. Instead the power nozzle fluid emanating from power nozzle 131 flows into either outlet leg 134 or outlet leg 135 when in a stable state. If the fluid is flowing in outlet leg 134, a portion of the fluid is fed back to the fluid amplifier control port 117 through the passage 143, the restriction 144, and the passage 145. This type of feedback is referred to as negative feedback and if the negative feedback signal is large enough switching of the power stream within amplifier 130 occurs. The fluid signal in control port 117 tends to drive the fluid emanating from power nozzle 118 into the outlet leg 119. The signal in outlet leg 119 is transmitted to bistable amplifier control port 132 through the passage 136. The presence of the fluid signal in control port 132 causes the bistable amplifier to divert its power stream into outlet leg 135. When this occurs a portion of the fluid flowing in outlet leg 135 is fed back to the control port 115 through the passage 140, the restriction 141, and the passage 142. The signal fed back from outlet leg 135 tends to drive the fluid stream emanating from power nozzle 118 into outlet leg 120. The fluid signal now present in outlet leg 120 is transmitted into fluid amplifier control port 133 through the passage 137 causing the switching process of bistable amplifier 130 to be repeated. That is, the bistable amplifier 130 oscillates since the feedback signal from the outlet legs is of sufficiently great magnitude to cause the bistable amplifier 130 to switch from one outlet leg to the other outlet leg. With the bistable amplifier 130 oscillating in such a manner the output signal has a zero differential the same as the fluid bistable amplifier 31 shown in FIGURE 1. That is, the pressure signals in passages 149 and 153 average out when the bistable amplifier 130 is oscillating. The result is that piston 72 remains in its present location.

If, however, a differential fluid signal is supplied to proportional amplifier 104 through passages 162 and 163, the piston 72 in chamber 71 is displaced. For example, if the fluid signal in control port 105 is greater than that in control port 107, more of the fluid stream emanating from power nozzle 110 flows into outlet leg 112 than into outlet leg 111. Hence, there is a differential signal at control ports 116 and 114 of fluid amplifier 113 tending to deflect more of the fluid stream emanating from power nozzle 118 into outlet leg 119 than into outlet leg 120. The greater signal in outlet leg 119 results in a larger signal in control port 132 than in control port 133 of the bistable amplifier 130. Hence, there is a signal tending to direct the fluid power stream from power nozzle 131 into outlet leg 135. From outlet leg 135 a portion of the fluid ignal is fed back through the passage 140, the restriction 141, the passage 142 to the control port 115. The fluid signal in control port 115 tends to deflect more of the fluid stream flowing from power nozzle 118 into outlet leg 120 than into outlet leg 119. Thus, since a signal is already present in control port 116 the fluid stream emanating from power nozzle 118 continues to supply a large enough signal to prevent switching and keeps the fluid power stream emanating from power nozzle 131 flowing in outlet leg 135. With the fluid flowing from outlet leg 135 into passage 153 the piston 72 is forced toward the left end of chamber 71. The movement of piston 72 toward the left chamber 71 causes the connecting rod 73 connecting link 85 and control rod 84 to be displaced to the left. The movement of control rod 84 to the left causes piston 83 to be displaced to the left causing an increase in the pressure of the fluid in left hand side of chamber 82. An increase in the pressure in the left hand side of chamber 82 causes a fluid signal to be transmitted through passage 161 into the control port 108. Similarly the pressure decreases in passage 160 causing a lower signal to be transmitted into control port 106. The differential signal at control ports 108 and 106 balances out the signals at control ports 105 and 107, resulting in a net differential signal of zero in summing amplifier 104. Hence, the power stream emanating from nozzle 110 divides equally between outlet legs 111 and 112. The equal pressures in outlet legs 111 and 112 causes the bistable amplifier to operate as a fluid oscillator since the negative feedback supply signals from amplifier legs 134 and 135 alternately supply signals to cause rapid switching of the stream from outlet leg 134 to outlet leg 135 and vice versa. With bistable amplifier 130 functioning as an oscillator the net differential signal at passage 149 and 153 is zero, hence, piston 72 is not displaced and the control system output remains stationary.

In summary I have provided a closed-loop fluid position control system in which a bistable amplifier becomes unstable and functions as an oscillator when no differential control signal is applied, and when a control signal is applied the bistable amplifier becomes stable and functions as a bistable amplifier.

I claim:

1. Apparatus of the class described comprising:
fluidic signal means having an output, and input means including a control signal input and a feedback signal input, said fluidic signal means operable to produce an oscillating output signal if no net differential signal is applied to said input means, said fluidic signal means further operable, in the presence of a net differential signal, to produce an output signal having one of two stable states, according to the sense of the net differential signal;
actuator means including a movable member whose position varies in response to a fluid signal;
first connecting means connecting the output of said fluidic signal means to said actuator means;
position feedback means associated with the movable member of said actuator means, said position feedback means operable to produce a differential feedback signal which varies continuously with the position of the movable member; and
second connecting means connecting said position feedback means to the feedback signal input of said fluidic signal means.

2. The apparatus of claim 1 wherein said actuator means and said first connecting means provide a high impedance load for said fluidic signal means, the high impedance load causing said fluidic signal means to produce the oscillating output signal in the absence of a net differential input signal.

3. The apparatus of claim 1 wherein said fluidic signal means includes a negative feedback network, the negative feedback network causing said fluidic signal means to produce the oscillating output signal in the absence of a net differential input signal.

4. The apparatus of claim 1 wherein said position feedback means includes a fluid potentiometer.

5. The apparatus of claim 1 further including a control signal source connected to supply control signals to the control signal input of said fluidic signal means.

6. The apparatus of claim 5 wherein the control signal source includes a fluid potentiometer.

7. A fluidic closed loop position control system comprising:
fluid summing means having a first input for accepting a control signal, a second input for accepting a feedback signal, and an output for producing a differential signal indicative of signals supplied to the first and second inputs;
a control signal source;
first connecting means connecting said control signal source to said first input;
fluid amplifier means having input means and output means, said fluid amplifier means operable to produce a fluid output signal having one of two stable states in response to a net differential input signal, the state of the fluid output signal being dependent on the sense of the differential input signal, said fluid amplifier means further operable to produce an oscillating fluid output signal in the absence of a net differential input signal;
second connecting means connecting the output of said fluid summing means to the input means of said fluid amplifier means;
actuator means including a movable member operable to change position in response to fluid signals;
third connecting means connecting the output means of said fluid amplifier means to said actuator means so as to convey the fluid output signal thereto;
position signal means associated with said actuator means, said position signal means operable to produce a feedback signal substantially proportional to the position of the movable member in said actuator means; and
fourth connecting means connecting said position signal means to the second input of said fluid summing means so as to convey the feedback signal thereto.

8. The apparatus of claim 7 wherein said actuator means and said third connecting means provide a high impedance load for said fluid amplifier means, the high impedance load causing said fluid amplifier to produce the oscillating output signal in the absence of a net differential input signal.

9. The apparatus of claim 7 further including a negative feedback network associated with said fluid amplifier means, the negative feedback network causing said fluid amplifier means to produce the oscillating output signal in the absence of a net differential input signal.

10. The apparatus of claim 7 wherein said control signal source includes a fluid potentiometer.

11. The apparatus of claim 7 wherein said position signal means includes a fluid potentiometer.

References Cited

UNITED STATES PATENTS

| | | | |
|---|---|---|---|
| 3,070,295 | 12/1962 | Glattli. | |
| 3,124,999 | 3/1964 | Woodward | 137—81.5 XR |
| 3,150,686 | 9/1964 | Kachline | 137—608 |
| 3,155,825 | 11/1964 | Boothe | 137—81.5 XR |
| 3,185,166 | 5/1965 | Horton et al. | 137—81.5 |
| 3,223,101 | 12/1965 | Bowles | 137—81.5 |
| 3,225,780 | 12/1965 | Warren et al. | 137—81.5 |
| 3,233,522 | 2/1966 | Stern | 137—81.5 XR |
| 3,234,934 | 2/1966 | Woodward | 137—81.5 XR |
| 3,333,596 | 8/1967 | Bottone | 137—81.5 |
| 3,362,633 | 1/1968 | Freeman | 235—201 |

FOREIGN PATENTS 1,278,781  11/1961  France.

SAMUEL SCOTT, Primary Examiner

U.S. Cl. X.R.

137—81.5